United States Patent [19]
Perino et al.

[11] Patent Number: 6,078,417
[45] Date of Patent: Jun. 20, 2000

[54] SPECTRAL COMPACTION VIA CROSS-MODULATION WAVELENGTH CONVERSION

[75] Inventors: Joseph S. Perino, Cranford; Jay M. Wiesenfeld, Lincroft Township, Monmouth County; Sheryl Leigh Woodward, Holmdel Township, Monmouth County, all of N.J.

[73] Assignee: Lucent Technologies Inc., Murray Hill, N.J.

[21] Appl. No.: 08/863,348

[22] Filed: May 29, 1997

Related U.S. Application Data

[60] Provisional application No. 60/018,734, May 31, 1996.

[51] Int. Cl.$^7$ .................................................. H04B 10/04
[52] U.S. Cl. .......................... 359/160; 359/161; 359/180; 359/188
[58] Field of Search ...................................... 359/326, 156, 359/160, 161, 180, 181, 188

[56] References Cited

U.S. PATENT DOCUMENTS

| | | | |
|---|---|---|---|
| 4,348,599 | 9/1982 | Pradere et al. | 307/426 |
| 5,015,054 | 5/1991 | Chaffee | 372/6 |
| 5,373,381 | 12/1994 | Alfano et al. | 359/108 |

OTHER PUBLICATIONS

G. P. Agrawal, *Fiber–Optic Communications Systems* 1992 (New York: Wiley–Interscience), pp. 46–57 and pp. 193–195.

S. L. Woodward and G.E. Bodeep, "Uncooled Fabry–Perot Lasers for QPSK Tranmission." IEEE Photonics Technol. Lett.., 1995, 7, pp 558–560.

R. E. Wagner, et al., "MONET: Multiwavelength Optical Networking," J. Lightwave Tech., 1996, 14, pp. 1349–1355.

G. R. Joyce and R. Olshansky, "Differential QPSK transmission system for 80 compressed digital video channels." OFC '93 Tech. Dig., Feb. 1993, pp. 224–225.

S.L. Woodward and G.E. Bodeep, "Uncooled Fabry–Perot Laser for QPSK Transmisson." IEEE Photonics Technol (no date).

J. M. Wiesenfeld, B. Glance, J. S. Perino, and A. H. Gnauck, "Wavelength Conversion at 10 Gb/s using a semiconductor optical amplifier," IEEE Photonics Tech. Lett., 1993, 5, pp. 1300–1320.

B. Mikkelsen, R. J. S. Pedersen, T. Durhuus, C. Braagaard, C. Joergensen and K. E. Stubkjaer, entitled "Wavelength conversion of high speed data signals," Electron. Lett. 1993, 29, pp. I716–1717.

T. Durhuus, C. Joergensen, B. Mikkelsen, R. J. S. Pedersen, and K. E. Stubkjaer, "All optical wavelength conversion in a Mach–Zehnder configuration," IEEE Photonics Tech. Lett., 1994, 6, pp. 53–55.

M. C. Tatham, G. Sherlock, and L. D. Westbrook, "20–nm optical wavelength conversion using nondegenerate four–wave mixing," IEEE Photonics Tech. Lett., 1993, 5, pp. 1303–1306.

S. J. B. Yoo, C. Caneau, R. Bhat, M. A. Koza, A. Rajhel, and N. Antonaides, "Wavelength conversion by difference frequency generation in ALGaAs waveguides with periodic domain inversion achieved by wafer bonding" Appl. Phys. Lett., 1996, 68, pp. 2609–2611.

*Primary Examiner*—Leslie Pascal

[57] ABSTRACT

An optical network comprising a broad band optical source having a temporal characteristic and an optical wavelength conversion apparatus. The optical wavelength conversion apparatus comprising a laser means for producing a narrow band optical spectrum signal, a means for receiving a broad band optical signal having a temporal characteristic, and a spectral compactor means. The spectral compactor means is responsive to the narrow band optical spectrum signal and the broad band optical signal, for modulating the narrow band optical signal with the temporal characteristic of the broad band optical signal. A polarization reset apparatus comprises a laser means for producing a narrow band optical spectrum signal having a first polarization, a means for generating a second optical signal having a temporal characteristic and a second polarization, and a spectral compactor means responsive to the first and second optical signals for modulating the first optical signal with the temporal characteristics of the second optical signal to produce an output signal having the temporal characteristic of the second optical signal and the spectral and polarization characteristics of the first optical signal.

30 Claims, 3 Drawing Sheets

SPECTRAL COMPACTION VIA CROSS-MODULATION WAVELENGTH CONVERSION

This application claims the priority date of the corresponding provisional application No. 60/018,734, filed May 31, 1996 and entitled "Wavelength conversion of 60 channel QPSK data using cross-gain compression in a semiconductor optical amplifier".

TECHNICAL FIELD OF THE INVENTION

This invention relates to optical communication systems and, more particularly, to providing optical wavelength conversion using cross modulation techniques.

BACKGROUND OF THE INVENTION

The spectral width, or bandwidth, of an optical signal in an optical communication system which propagates through a dispersive medium, such as optical fiber, is a crucial parameter. To minimize signal degradation caused by dispersion effects, the bandwidth of the optical signal should be as small as possible, and, preferably, limited by the information bandwidth of the data carried on the optical signal. See for example, G. P. Agrawal, *Fiber-Optic Communications Systems* 1992 (N.Y.: Wiley-Interscience), pp. 46–57 and pp. 193–195. In many cases, the most inexpensive sources from which an optical signal is generated produce signals with spectral widths far exceeding that of the information bandwidth. For example, Fabry-Perot lasers with many spectral modes are inexpensive sources that have been used in experiments involving the QPSK data modulation format. See the article by S. L. Woodward and G. E. Bodeep, "Uncooled Fabry-Perot Lasers for QPSK Transmission." IEEE Photonics Technol. Lett., 1995, 7, pp 558–560.

Furthermore, in some proposed networks wavelength conversion in the distribution system would prove useful, for example in architecture where wavelength selective routing is desired. Generally, networks in which wavelength conversion are important, such as the MONET network, require all signals to have well controlled and narrow optical spectra. See, for example, R. E. Wagner, et al., "MONET: Multiwavelength Optical Networking," J. Lightwave Tech., 1996, 14, pp. 1349–1355.

As one example of an optical modulation format, subcarrier multiplexing is a popular low-cost method for transmitting digital signals. The QPSK modulation format is commonly used because it is very robust, yet uses bandwidth efficiently. See, for example, the article by G. R. Joyce and R. Olshansky, "Differential QPSK transmission system for 80 compressed digital video channels." OFC '93 Tech. Dig., Feb. 1993, pp. 224–225 and the article by S. L. Woodward and G. E. Bodeep, "Uncooled Fabry-Perot Lasers for QPSK Transmission." IEEE Photonics Technol. Lett.., 1995, 7, pp 558–560. Another example of an optical modulation format is simply digital intensity modulation or on-off keying (OOK).

It would therefore be desirable to be able to convert the wide, excessive spectrum of any optical source to a well-controlled, narrow band spectrum suitable for transmission over a link with dispersion.

SUMMARY OF THE INVENTION

In accordance with the present invention, an optical network comprises at least one broad band optical source having a temporal characteristic and an optical spectral compaction apparatus comprising a laser means for producing a narrow band optical spectrum signal, a means for receiving a broad band optical signal having a temporal characteristic, and a spectral compactor means. The spectral compactor means is responsive to the narrow band optical spectrum signal and the broad band optical signal, for modulating the narrow band optical signal with the temporal characteristic of the broad band optical signal. Only the temporal profile of the input, broad band optical signal is used by the spectral compactor to modulate a second, CW input beam. The spectral compaction device copies, either directly or inverted, the temporal information of the input signal onto the CW signal, which is input and output with a narrow band optical spectrum, with good quality. The signal may, of course, suffer some minor distortion in this process.

According to other features of the invention, the spectral compactor means may be implemented as a wavelength conversion device using a Semiconductor Optical Amplifier (SOA), a laser diode, or as an optoelectronic wavelength converter including at least a photodiode, electronic amplifier, and a second signal modulator. According to another feature the spectral compactor means may use carrier density modulation, electron modulation, cross-gain modulation, or cross-phase modulation. According to yet another feature, the narrow band optical signal and the broad band optical signal may be counter-propagating signals. Additionally, the output from the spectral compactor means will have the polarization state of the narrow band, CW signal.

According to another aspect of the invention, a polarization reset apparatus comprises a laser means for producing a narrow band optical spectrum signal having a first polarization, a means for generating a second optical signal having a temporal characteristic and a second polarization, and a spectral compactor means responsive to the first and second optical signals for modulating the first optical signal with the temporal characteristics of the second optical signal to produce an output signal having the temporal characteristic of the second optical signal and the spectral and polarization characteristics of the first optical signal.

DETAILED DESCRIPTION

Figure 1:
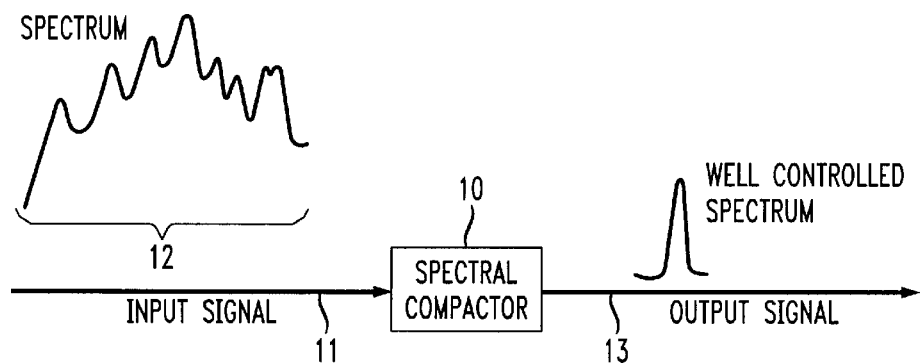
FIG. 1 shows a schematic view, in block diagram form, of a spectral compactor constructed in accordance with the present invention.
Figure 2:
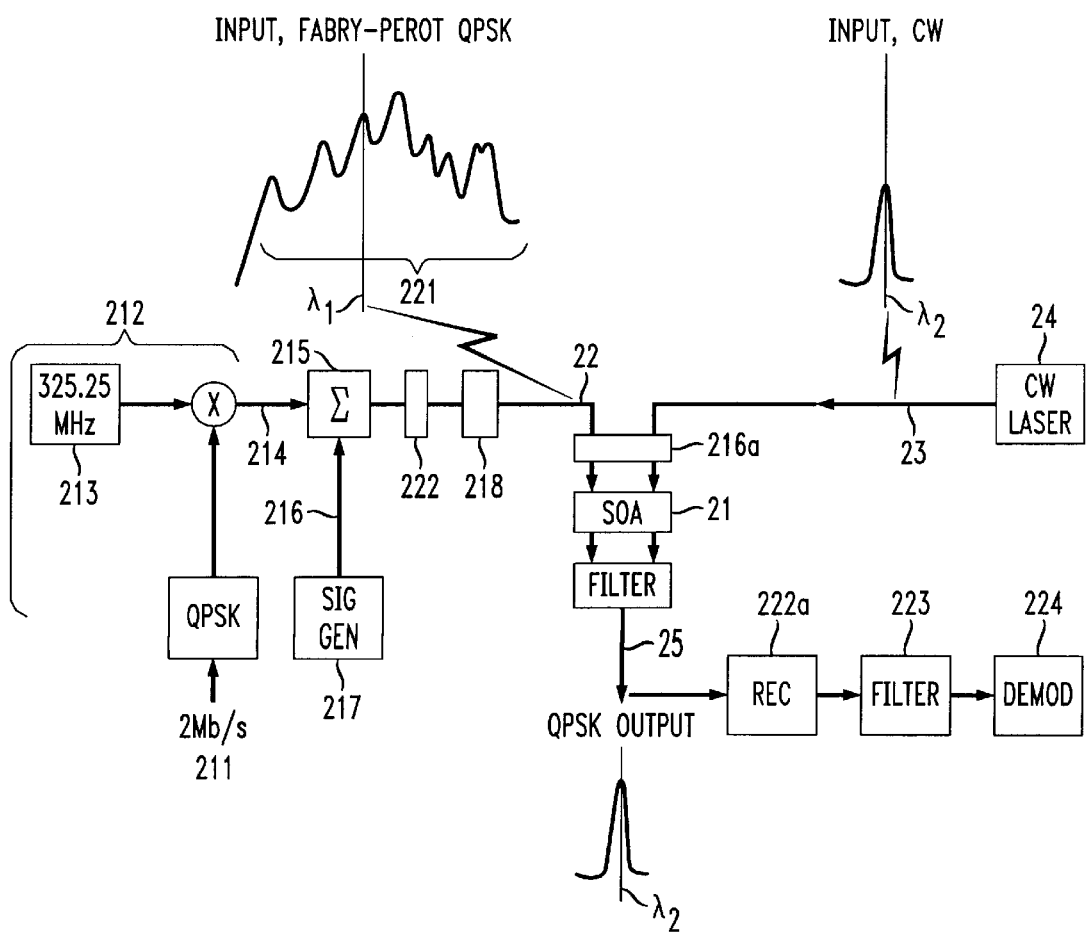
FIG. 2 shows a schematic view of a SOA employed to achieve spectral compaction in accordance with an illustrative embodiment of the present invention.

With reference now to FIGS. 1 and 2, there is shown a spectral compactor means 10 constructed in accordance with the teachings of the present invention. As seen in FIG. 1, the spectral compactor 10 of the present invention may be represented as a "black box" in which the optical spectrum of an input, intensity modulated signal 11 which may have poor spectral characteristics 12 such as a broad multi-mode shape or the broad spectrum from a light-emitting diode (LED), into a signal 13 having a well controlled spectrum with a "clear" single-mode shape.

As shown in FIG. 2, a spectral compactor device 10 constructed in accordance with the present invention may be configured using cross-gain or cross-phase modulation (XPM) in a SOA (or laser diode) 21 of the type described in the following articles: J. M. Wiesenfeld, B. Glance, J. S. Perino, and A. H. Gnauck, "Wavelength Conversion at 10 Gb/s using a semiconductor optical amplifier," IEEE Photonics Tech. Lett., 1993, 5, pp. 1300–1320; B. Mikkelsen, R. J. S. Pedersen, T. Durhuus, C. Braagaard, C. Joergensen and K. E. Stubkjaer, entitled "Wavelength conversion of high speed data signals," Electron. Lett.. 1993, 29, pp. 1716–1717; T. Durhuus, C. Joergensen, B. Mikkelsen, R. J. S. Pedersen, and K. E. Stubkjaer, "All optical wavelength conversion in a Mach-Zehnder configuration," IEEE Photonics Tech. Lett., 1994, 6, pp. 53–55. The spectral compactor device 10 may be a wavelength conversion device, based on optical-optical modulation of the cross-modulation type, which encodes intensity modulated data 221 on an incoming signal 22 to the wavelength of a second Continuous Wave (CW) signal 23. The second CW signal 23 may originate from any suitable laser 24 such as, for example, one having a very narrow line width. The spectral characteristics of the second signal 23 are those of the CW laser 24. The cross-modulation device will use cross-gain and/or cross-phase modulation or could use otpoelectronic signal detection followed by remodulation. Because of the cross-modulation function occurring in the spectral compactor device 10, the temporal characteristics of the incoming signal 22 are copied, either directly or inverted, onto the second signal 23 to produce the output signal 25. The polarization state of the output signal 25 is that of the second input signal 23, so that the polarization state of the incoming signal 22 has been set to that of the second input signal 23. It is desirable that the spectral compactor device 10 have a polarization-independent response, so that the spectral compactor device works independently of the polarization state of the incoming signal 22, which may be randomly varying or not well defined because of the nature of the propagation path in the optical network prior to the spectral compactor.

It should be noted that the input signal 22 and input CW beam 23 could be counter-propagating for devices using cross-gain and/or cross-phase modulation, eliminating the need for a filter and allowing the "wavelength converted" and "spectrally compacted" output 25 to have the same wavelength as the input signal 23.

Figure 3:
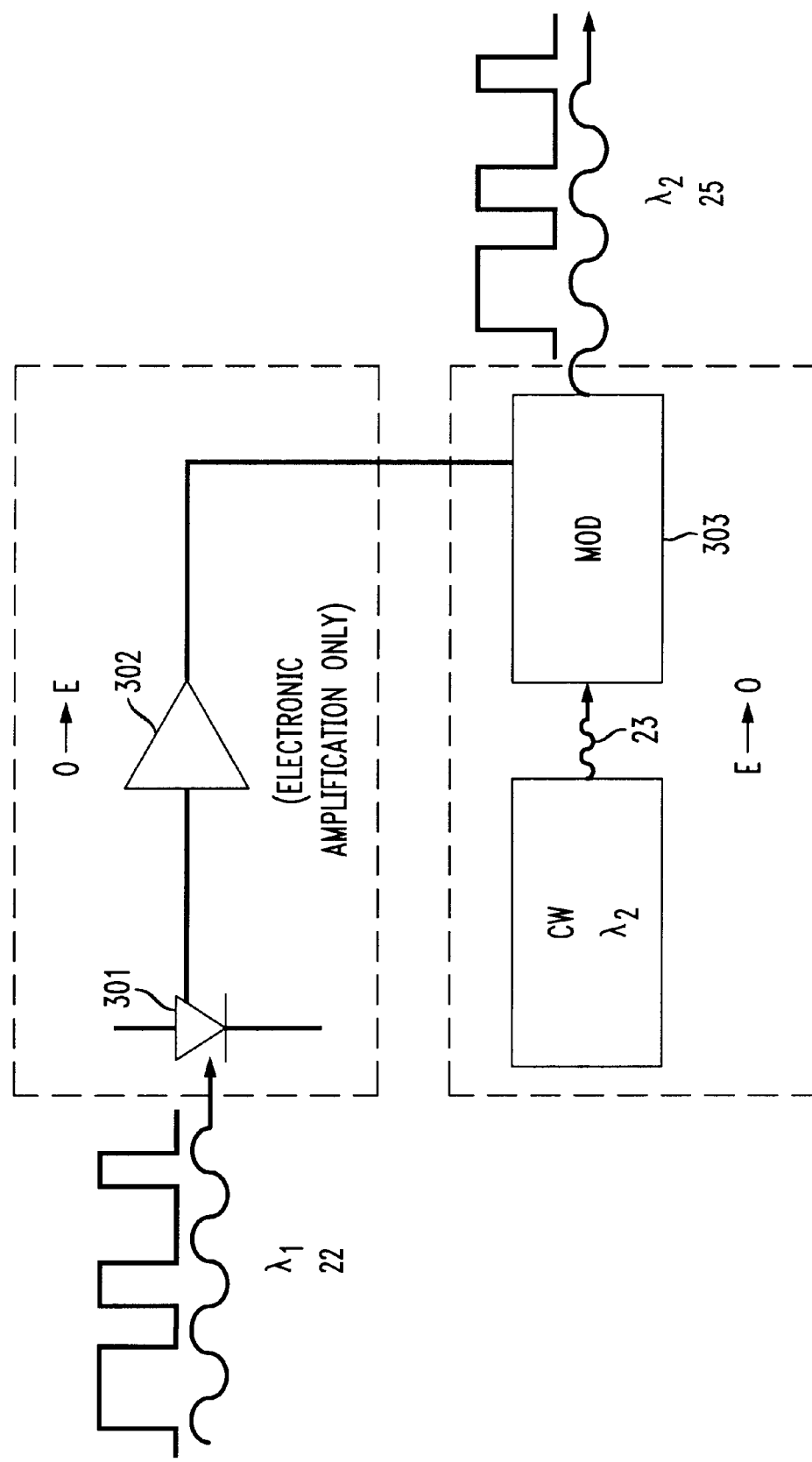
FIG. 3 shows a schematic of an optoelectronic wavelength conversion device used as a spectral compaction device.

With reference to FIG. 3, the spectral compactor 10 may, alternatively, be configured as an optoelectronic wavelength converter, where the components include a photodiode 301, electronic amplifier 302 and modulator 303, the latter being applied to the input CW beam signal 23. In such a device, the input 22 and output wavelengths 25 may be the same and no optical filter is necessary.

For spectral compactor devices based on semiconductor optical amplifiers (SOA's) or laser diodes (LD's), the incoming signal 22 modulates the carrier density within the SOA or LD by stimulated emission of the incoming signal 22. This carrier density modulation changes the gain and refractive index of the SOA or LD. The former effect is used for cross-gain modulation and the latter is used for cross-phase modulation. For optoelectronic spectral compaction devices, the incoming signal 22 is detected by the photoreceiver and converted to a time-varying electronic current. This current is amplified and used to drive an optical modulator which copies the time-varying incoming signal 22 to a CW signal 23. Thus, in optoelectronic spectral compaction there is a time-varying electron density in the receiver-amplifier-modulator circuit.

It should be noted that optical apparatuses which can perform wavelength based on coherent, nonlinear optical techniques, such as four-wave mixing (see M. C. Tatham, G. Sherlock, and L. D. Westbrook, "20-nm optical wavelength conversion using nondegenerate four-wave mixing," IEEE Photonics Tech. Lett., 1993, 5, pp. 1303–1306) or difference frequency generation (see S. J. B. Yoo, C. Caneau, R. Bhat, M. A. Koza, A. Rajhel, and N. Antonaides, Appl. Phys. Lett., 1996, 68, pp. 2609–2611), would not serve as a spectral compactor 10, because the optical frequencies interact directly through the nonlinear optical susceptibility, rather than through a carrier density (or electron) modulation, and the spectrum of the output signal is a convolution of the spectra of both the input signal and CW signal.

A spectral compactor 10 could be useful in a "wavelength adaptation" scheme, wherein the output of an inexpensive laser, with poor spectral quality, could be converted to a signal with good spectral quality. Also, it could be used to convert the spectrum to a wavelength compatible with a particular network.

The spectral compactor 10 can also be used to reset the polarization state of an input signal 22 to that of a second signal 23.

As a particular example and with continued reference to FIG. 2, we demonstrate wavelength conversion of 60 channel Quadrature-Phase-Shift Keyed (QPSK) data using cross-gain compression modulation in a semiconductor optical amplifier (SOA). One illustrative wavelength conversion technique using a SOA is described in the article by J. M. Wiesenfeld, B. Glance, J. S. Perino and A. H. Gnauck, entitled "Wavelength Conversion at 10 Gb/s using a semiconductor optical amplifier," IEEE Photonics Technol. Lett., 1993, 5, pp. 1300–1302.

In the illustrative system shown in FIG. 2, a 2 Mb/s, $2^{20}-1$ Pseudo-Random-Bit-Sequence (PRBS) 211 is inputted to a QPSK encoder 212 and upconverted, by upconverter 213, to 325.25 MHz. The data channel signal 214 was then multiplexed, in multiplexer 215, with 59 unmodulated channels 216, spaced by 6 MHz, from a multi-frequency signal from signal generator 217. The frequency range of the unmodulated channels 216 is 55.25 MHz to 439.25 MHz. The data signal is used to directly modulate an optical laser source 218 which may be an uncooled commercial, Fabry-Perot laser, with a 30 nm broad spectrum 221 centered around 1555 nm. We controlled the optical modulation depth with a variable RF attenuator 222 before the Fabry-Perot laser 218.

Figure 6:
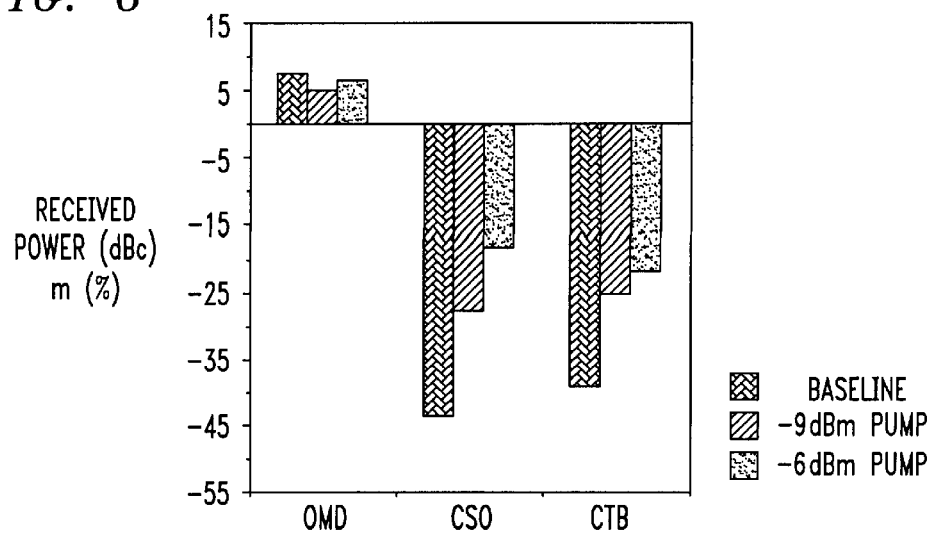
FIG. 6 shows a comparison of OMD, CSO, and CTB for the input and shifted signals for wavelength conversion to 1520 nm. Data is shown for two different input pump powers, −6 dBm and −9 dBm.

The data channel modulated Fabry-Perot light (pump) signal 22 is combined with the output of a CW externalcavity-laser (probe) 23 in a coupler 216a, and then input to a bulk Indium Gallium Arsenide Phosphide (InGaAsP), fiber-pigtailed, 1.55 $\mu$m SOA 21. The data channel signal 22 modulates the gain of the SOA 21, which is sensed by the CW laser probe 23, thus transferring the QPSK data, of data channel signal 22, to the signal wavelength 23 of the probe laser 24, i.e., 1520 nm. Furthermore, the spectrum 221 of the data channel signal 22 is changed from that of the Fabry-Perot laser to the wavelength spectrum ($\lambda_2$) of the single frequency probe signal 23. To avoid serious noise penalties, the wavelength 1520 nm of the probe signal 23 was chosen to lie between Fabry-Perot modes of the signal laser 22. Data signals 25 outputted from the SOA 21 was detected using a broadband receiver 222a, followed with a 10 MHz bandpass filter 223 to isolate the data channel at 325.25 MHz. The signal was downconverted, demodulated in the QPSK modem 224 and the BER was measured. In addition, we measured, in FIG. 6, the Optical Modulation Depth (OMD), Composite Second Order distortion (CSO), and Composite Triple Beat (CTB) for the input 22 and shifted 25 signals.

Figure 4:
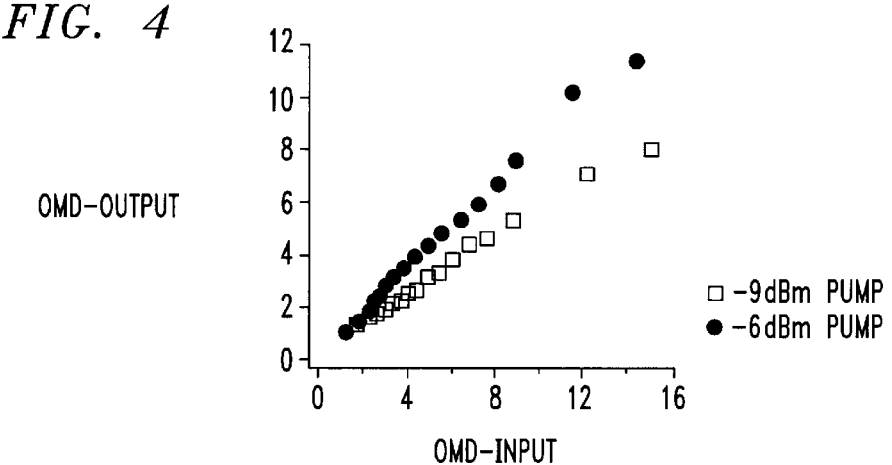
FIG. 4 plots data showing conversion efficiency, plotted as optical modulation depth (OMD) after wavelength conversion to 1520 nm vs. OMD input, for −6 dBm and −9 dBm input pump powers. The input probe power is −15 dBm measured at the splice to the pigtailed optical amplifier, and the SOA bias is 135 mA.
Figure 5:
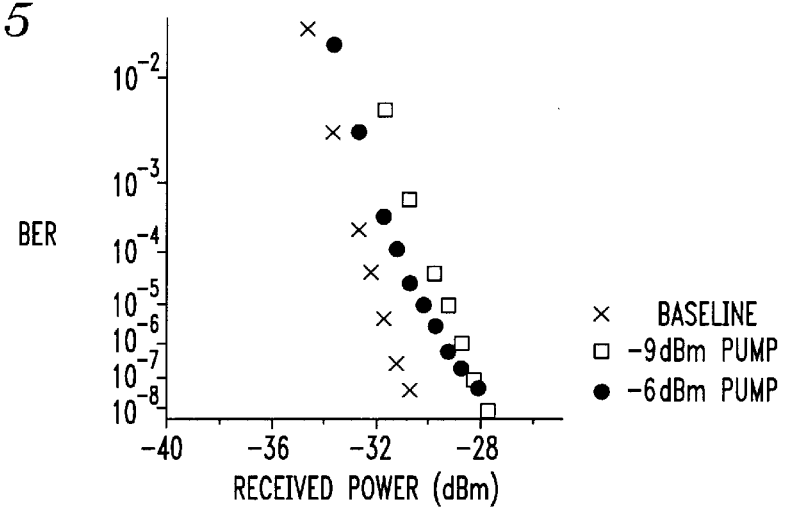
FIG. 5 plots the BER vs. received power, measured at the fiber splice to the receiver. The X's are the baseline data measured directly from the laser source with OMD 7.7%, the open squares are for wavelength conversion to 1520 nm with −9 dBm input pump power, and the closed circles are for conversion to 1520 nm with −6 dBm input pump power. The input probe power is −15 dBm and the SOA bias is 135 mA.

FIG. 4 plots the optical modulation depth (OMD) for the 1520 nm wavelength converted signal, with –6 dBm and –9 dBm SOA input signal powers, vs. the pump OMD. As expected, conversion efficiency is better with higher –6 dBm input pump powers. FIG. 5 shows BER vs. received power for the back-to-back and wavelength converted signals at 1520 nm. with an input OMD of 7.7%. For the lower –9 dBm input signal power, there is a 2.2 dB penalty in received power relative to baseline at $10^{-7}$ BER, 1.7 dB of which is from a reduction in OMD from 7.7% to 5.2%. For the higher –6 dBm input power, there is a reduction in OMD from 7.7% to 6.9%, leading to a 0.5 dB penalty in received power at low error rates; however, there is evidence of a BER floor. This floor is from increased second and third order distortion, as summarized in FIG. 6. For the higher –6 dBm input power, the SOA is beginning to saturate and the increased nonlinearity causes a BER floor to develop. While the circuit of FIG. 2 demonstrates wavelength conversion of the QPSK signal to a 1520 nm signal (from CW laser 24), we have also demonstrated wavelength conversion of the QPSK signal to a 1540 nm signal.

In summary of this example, we have demonstrated wavelength conversion of 60 QPSK changes, from 1555 nm to 1520 nm. We measured BERs for wavelength conversion of 2 Mb/s data on a 325.25 MHz subcarrier, with a received power penalty of approximately 2 dB and no evidence of a floor down to $10^{-8}$ BER. This penalty is primarily from degraded OMD. There is a tradeoff between conversion efficiency and distortion, as evidenced by BER floor from nonlinearities when higher input signal powers were used to improve the output OMD. Note however, that in this illustrative example, the spectrum of the signal has been changed from that of a Fabry-Perot, multi-mode laser spectrum to that of a single-mode laser spectrum.

What has been described is merely illustrative of the application of the principles of the present invention. Other arrangements and methods can be implemented by those skilled in the art without departing from the spirit and scope of the present invention.

We claim:

1. An optical network comprising
   at least one broad band optical source having a temporal characteristic, and
   an optical spectrum compaction apparatus comprising
   laser means for producing a narrow band continuous wave, CW, optical spectrum signal,
   means for receiving a broad band optical signal having a temporal characteristic and
   spectral compactor means, responsive to the narrow band optical spectrum signal and the broad band optical signal, for modulating the narrow band optical signal with the temporal characteristic of the broad band optical signal to produce a modulated narrow band signal that is modulated with the temporal characteristics of the broad band signal.

2. The optical network of claim 1 wherein the spectral compactor means is a wavelength conversion apparatus.

3. The optical network of claim 1 wherein the broad band optical signal originates from a LED.

4. The optical network of claim 1 wherein the spectral compactor means is a semiconductor optical amplifier.

5. The optical spectrum compaction apparatus of claim 1 wherein the spectral compactor means is a laser diode.

6. The optical network of claim 1 wherein the spectral compactor means uses carrier density modulation.

7. The optical network of claim 1 wherein the spectral compactor means uses electron modulation.

8. The optical network of claim 1 wherein the spectral compactor means uses cross-gain modulation.

9. The optical network of claim 1 wherein the spectral compactor means uses cross-phase modulation.

10. The optical network of claim 1 wherein narrow band optical signal and the broad band optical signal are counter-propagating.

11. The optical network of claim 1 wherein the spectral compactor means is configured as an optoelectronic wavelength converter including at least a photodiode, electronic amplifier, and a signal modulator.

12. The optical network of claim 1 further comprising
   a filter for filtering the modulated narrow band optical signal from the spectral compactor means.

13. The optical network of claim 1 wherein narrow band optical signal and the broad band optical signal have different polarizations.

14. The optical network of claim 1 wherein the spectral compactor means is polarization-insensitive.

15. The optical network of claim 1 wherein the broad band optical signal has a varying polarization and the narrow band signal has a fixed polarization.

16. The optical network of claim 1 wherein the broad band optical signal is a multiplexed subcarrier signal.

17. The optical network of claim 1 wherein the broad band signal is a multi-wavelength signal and the narrow band optical signal has a single wavelength which lies between two of the wavelengths of the broadband optical signal.

18. The optical network of claim 1 wherein the broad band optical signal is modulated using a QPSK format.

19. The optical network of claim 1 wherein the broad band optical signal is modulated using on/off keying.

20. A method of operating an optical network comprising the steps of
   receiving a narrow band optical spectrum signal,
   receiving a broad band optical signal having a temporal characteristic and
   modulating the narrow band continuous wave, CW, optical signal with the temporal characteristic of the broad band optical signal to produce a modulated narrow band signal that is modulated with the temporal characteristics of the broad band signal.

21. A polarization reset apparatus comprising
   a laser means for producing a first continuous wave, CW, narrow band optical spectrum signal having a first polarization, means for generating a second optical signal having a temporal characteristic and a second polarization, and spectral compactor means responsive to the first and second optical signals for modulating the first optical signal with the temporal characteristics of the second optical signal to produce an output signal having the temporal characteristic of the second optical signal and the spectral and polarization characteristics of the first optical signal.

22. The polarization reset apparatus of claim 21 wherein the first polarization is fixed.

23. The polarization reset apparatus of claim 21 wherein the second polarization is time-varying.

24. The polarization reset apparatus of claim 21 wherein the spectral compactor means is a semiconductor optical amplifier.

25. The polarization reset apparatus of claim 21 wherein the spectral compactor means is a laser diode.

26. The polarization reset apparatus of claim 21 wherein the spectral compactor means is configured as an optoelectronic wavelength converter including at least a photodiode, electronic amplifier, and a second signal modulator.

27. The polarization reset apparatus of claim 21 wherein the spectral compactor means is a wavelength converter apparatus.

28. The polarization reset apparatus of claim 21 wherein the broad band optical signal originates from an LED.

29. The polarization reset apparatus of claim 21 wherein the narrow band optical signal and the broad band optical signal are counter-propagating.

30. A method of operating a polarization reset apparatus comprising the steps of receiving a first continuous wave, CW, narrow band optical spectrum signal having a first polarization, generating a second optical signal having a temporal characteristic and a second polarization, and modulating the first optical signal with the temporal characteristics of the second optical signal, using a spectral compactor device, to produce an output signal having the temporal characteristic of the second optical signal and the spectral and polarization characteristics of the first optical signal.

* * * * *